(12) United States Patent
Nakano (10) Patent No.: US 8,315,851 B2
(45) Date of Patent: Nov. 20, 2012

(54) PHONETIC KEYS FOR THE JAPANESE LANGUAGE

(75) Inventor: Hozumi Nakano, La Crosse, WI (US)

(73) Assignee: Business Objects Software Limited, Dublin (IE)

( * ) Notice: Subject to any disclaimer, the term of this patent is extended or adjusted under 35 U.S.C. 154(b) by 322 days.

(21) Appl. No.: 12/826,697

(22) Filed: Jun. 30, 2010

(65) Prior Publication Data
US 2012/0004901 A1 Jan. 5, 2012

(51) Int. Cl.
*G06F 17/27* (2006.01)
(52) U.S. Cl. .................................. 704/9; 704/8
(58) Field of Classification Search .................. 704/8, 9
See application file for complete search history.

(56) References Cited

U.S. PATENT DOCUMENTS

| | | | |
|---|---|---|---|
| 1,261,167 A | | 4/1918 | Russell et al. |
| 4,484,305 A | * | 11/1984 | Ho ................................. 715/210 |
| 4,658,374 A | * | 4/1987 | Tanimoto et al. .................. 704/3 |
| 4,951,202 A | | 8/1990 | Yan |
| 6,275,216 B1 | * | 8/2001 | Kitamura ....................... 345/171 |
| 7,523,102 B2 | | 4/2009 | Bjarnestam et al. |
| 2003/0088398 A1 | * | 5/2003 | Guo et al. .......................... 704/8 |
| 2006/0061556 A1 | * | 3/2006 | Yamane ......................... 345/173 |
| 2006/0106769 A1 | * | 5/2006 | Gibbs ............................... 707/3 |
| 2009/0077039 A1 | * | 3/2009 | Narahara .......................... 707/3 |
| 2011/0102206 A1 | * | 5/2011 | Huang et al. .................... 341/28 |

OTHER PUBLICATIONS

Wikipedia; Double Metaphonel; Jun. 14, 2010; Wikipedia; (http://en.wikipedia.org/wiki/Double_Metaphone).
Adam Nelson; Implement Phonetic ("Sounds-like") Name Searches with Double Metaphone Part II: Visual Basic and Relational Database Solutions; Mar. 19, 2007; Code Project, Canada; (http://www.codeproject.com/KB/vbscript/dmetaphone2.aspx).
DMG Federal; An Introduction to Double Metaphone and the Principles behind Soundex; 2010; DMG Federal, Newsport News, VA, USA; (http://www.dmgfederal.com/Resources/Articles/Article_IntroductionToDoubleMetaphone.asp).
Wikipedia; Monogram; Jun. 25, 2010; Wikipedia; (http://en.wikipedia.org/wiki/Monogram).
Wikipedia; Bigram; Apr. 3, 2010; Wikipedia; (http://en.wikipedia.org/wiki/Bigram).
Dictionary-Thesaurus.com; Trigrams & Bigrams; 2001; Xerostar Holdings, Rivervale, Western Australia; (http://dictionary-thesaurus.com/Trigrams.html).
Sound-Ex.com; Alternative to Soundex; Accessed on Jun. 30, 2010; Sauldorf, Germany; (http://www.sound-ex.com/alternative_double.htm).

* cited by examiner

*Primary Examiner* — Jakieda Jackson (57) ABSTRACT

Various embodiments of phonetic keys for the Japanese language are described herein. A Kana rule set is applied to Kana characters provided by a user. The Kana characters are defined in an alphabetic language based on the sound of the Kana characters. A full phonetic key is then generated based on the defined Kana characters. A replaced-vowel phonetic key is generated by replacing a vowel in the full phonetic key and a no-vowel phonetic key is generated by removing the vowel in the full phonetic key. Kana records in a database are then processed to determine a relevant Kana record that has a phonetic key identical to at least one of the full phonetic key, the replaced-vowel phonetic key, and the no-vowel phonetic key. The relevant Kana records are then presented to the user.

36 Claims, 11 Drawing Sheets

FIGURE 1

| あ ア a | い イ i | う ウ u | え エ e | お オ o |
|---|---|---|---|---|
| か カ ka | き キ ki | く ク ku | け ケ ke | こ コ ko |
| さ サ sa | し シ si | す ス su | せ セ se | そ ソ so |
| た タ ta | ち チ ci | つ ツ cu | て テ te | と ト to |
| な ナ na | に ニ ni | ぬ ヌ nu | ね ネ ne | の ノ no |
| は ハ ha wa | ひ ヒ hi | ふ フ fu | へ ヘ he e | ほ ホ ho |
| ま マ ma | み ミ mi | む ム mu | め メ me | も モ mo |
| や ヤ ya | | ゆ ユ yu | | よ ヨ yo |
| ら ラ ra | り リ ri | る ル ru | れ レ re | ろ ロ ro |
| わ ワ wa | ゐ ヰ i | | ゑ ヱ e | を ヲ o wo |
| が ガ ga | ぎ ギ gi | ぐ グ gu | げ ゲ ge | ご ゴ go |
| ざ ザ za | じ ジ ji | ず ズ zu | ぜ ゼ ze | ぞ ゾ zo |
| だ ダ da | ぢ ヂ ji | づ ヅ zu | で デ de | ど ド do |
| ば バ ba | び ビ bi | ぶ ブ bu | べ ベ be | ぼ ボ bo |
| ぱ パ pa | ぴ ピ pi | ぷ プ pu | ぺ ペ pe | ぽ ポ po |

FIGURE 2A

| きぁ キァ kya | きぃ キィ ki | きぅ キゥ kyu | きぇ キェ kye | きぉ キォ kyo |
|---|---|---|---|---|
| きゃ キャ kya | | きゅ キュ kyu | | きょ キョ kyo |
| しぁ シァ sya | しぃ シィ si | しぅ シゥ syu | しぇ シェ sye | しぉ シォ syo |
| しゃ シャ sya | | しゅ シュ syu | | しょ ショ syo |
| ちぁ チァ cya | ちぃ チィ ci | ちぅ チゥ cyu | ちぇ チェ cye | ちぉ チォ cyo |
| ちゃ チャ cya | | ちゅ チュ cyu | | ちょ チョ cyo |
| にぁ ニァ nya | にぃ ニィ ni | にぅ ニゥ nyu | にぇ ニェ nye | にぉ ニォ nyo |
| にゃ ニャ nya | | にゅ ニュ nyu | | にょ ニョ nyo |
| ひぁ ヒァ hya | ひぃ ヒィ hi | ひぅ ヒゥ hyu | ひぇ ヒェ hye | ひぉ ヒォ hyo |
| ひゃ ヒャ hya | | ひゅ ヒュ hyu | | ひょ ヒョ hyo |
| みぁ ミァ mya | みぃ ミィ mi | みぅ ミゥ myu | みぇ ミェ mye | みぉ ミォ myo |
| みゃ ミャ mya | | みゅ ミュ myu | | みょ ミョ myo |
| りぁ リァ rya | りぃ リィ ri | りぅ リゥ ryu | りぇ リェ rye | りぉ リォ ryo |
| りゃ リャ rya | | りゅ リュ ryu | | りょ リョ ryo |

FIGURE 2B

| ぎぁ ギァ gya | ぎぃ ギィ gi | ぎぅ ギゥ gyu | ぎぇ ギェ gye | ぎぉ ギォ gyo |
|---|---|---|---|---|
| ぎゃ ギャ gya | | ぎゅ ギュ gyu | | ぎょ ギョ gyo |
| じぁ ジァ ja | じぃ ジィ ji | じぅ ジゥ ju | じぇ ジェ je | じぉ ジォ jo |
| じゃ ジャ ja | | じゅ ジュ ju | | じょ ジョ jo |
| ぢぁ ヂァ ja | ぢぃ ヂィ ji | ぢぅ ヂゥ ju | ぢぇ ヂェ je | ぢぉ ヂォ jo |
| ぢゃ ヂャ ja | | ぢゅ ヂュ ju | | ぢょ ヂョ jo |
| びぁ ビァ bya | びぃ ビィ bi | びぅ ビゥ byu | びぇ ビェ bye | びぉ ビォ byo |
| びゃ ビャ bya | | びゅ ビュ byu | | びょ ビョ byo |
| ぴぁ ピァ pya | ぴぃ ピィ pi | ぴぅ ピゥ pyu | ぴぇ ピェ pye | ぴぉ ピォ pyo |
| ぴゃ ピャ pya | | ぴゅ ピュ pyu | | ぴょ ピョ pyo |

| いぁ イァ ia ya | | いぅ イゥ iu yu | いぇ イェ ie ye | いぉ イォ io yo |
|---|---|---|---|---|
| うぁ ウァ wa ua | うぃ ウィ ui wi | | うぇ ウェ ue we | うぉ ウォ wo uo |
| ゐぁ ヰァ wa ua | ゐぃ ヰィ ui wi | | ゐぇ ヰェ ue we | ゐぉ ヰォ wo uo |
| くぁ クァ ka, kua | くぃ クィ kui | くぅ クゥ ku | くぇ クェ kue | くぉ クォ kuo |
| ぐぁ グァ ga gua | ぐぃ グィ gui gi | ぐぅ グゥ gu | ぐぇ グェ gue ge | ぐぉ グォ guo go |
| ぶぁ ブァ ba | ぶぃ ブィ bi | ぶぅ ブゥ bu | ぶぇ ブェ be | ぶぉ ブォ bo |
| ぷぁ プァ pa | ぷぃ プィ pi | ぷぅ プゥ pu | ぷぇ プェ pe | ぷぉ プォ po |

FIGURE 2C

| つぁ ツァ<br>ca | つぃ ツィ<br>ci | つぅ ツゥ<br>cu | つぇ ツェ<br>ce | つぉ ツォ<br>co |
|---|---|---|---|---|
| づぁ ヅァ<br>za | づぃ ヅィ<br>ji | づぅ ヅゥ<br>zu | づぇ ヅェ<br>zc | づぉ ヅォ<br>zo |
| とぁ トァ<br>ta | とぃ トィ<br>ti | とぅ トゥ<br>tu | とぇ トェ<br>te | とぉ トォ<br>to |
| どぁ ドァ<br>da | どぃ ドィ<br>di | どぅ ドゥ<br>du | どぇ ドェ<br>de | どぉ ドォ<br>do |
| ふぁ ファ<br>fa | ふぃ フィ<br>fi | ふぅ フゥ<br>fu | ふぇ フェ<br>fe | ふぉ フォ<br>fo ho |
| ふゃ フャ<br>fa | | ふゅ フュ<br>fu | | ふょ フョ<br>fo |
| てぁ テァ<br>ta | てぃ ティ<br>ti | てぅ テゥ<br>tu | てぇ テェ<br>te | てぉ テォ<br>to |
| てゃ テャ<br>ta | | てゅ テュ<br>tu | | てょ テョ<br>to |
| でぁ デァ<br>da | でぃ ディ<br>di | でぅ デゥ<br>du | でぇ デェ<br>de | でぉ デォ<br>do |
| でゃ デャ<br>da | | でゅ デュ<br>du | | でょ デョ<br>do |

| う゛ぁ ヴァ<br>ba | う゛ぃ ヴィ<br>bi | う゛ぅ ヴゥ<br>bu | う゛ぇ ヴェ<br>bc | う゛ぉ ヴォ<br>bo |
|---|---|---|---|---|
| う゛ゃ ヴャ<br>bya ba | | う゛ゅ ヴュ<br>byu bu | | う゛ょ ヴョ<br>byo bo |

| ヴ<br>bu | ヶ<br>ka ga | ヵ<br>ka |
|---|---|---|

| あ ア<br>a | い イ<br>i | う ウ<br>u | え エ<br>e | お オ<br>o |
|---|---|---|---|---|
| や ヤ<br>ya | | ゆ ユ<br>yu | | よ ヨ<br>yo |

FIGURE 2D

| INPUT (KANA CHARACTERS) | PRIMARY FULL PHONETIC KEY | SECONDARY FULL PHONETIC KEY | PRIMARY REPLACED-VOWEL PHONETIC KEY | SECONDARY REPLACED-VOWEL PHONETIC KEY | PRIMARY NO-VOWEL PHONETIC KEY | SECONDARY NO-VOWEL PHONETIC KEY |
|---|---|---|---|---|---|---|
| ながさき | nagasaki | | n_g_s_k_ | | ngsk | |
| しんばし | si*basi | | s_*b_s_ | | s*bs | |
| いっこく | i^koku | | i^k_k_ | | i^kk | |
| キャッツ | kya^cu | | ky_^c_ | | ky^c | |
| キャツ | kyacu | | ky_c_ | | kyc | |
| キャー | kya | | ky_ | | ky | |
| キャア | kya | | ky_ | | ky | |
| キャアー | kya | | ky_ | | ky | |
| キャアア | kya | | ky_ | | ky | |
| キャア | kya | | ky_ | | ky | |
| イエイ | ie | ye | i_ | y_ | i | y |
| イェーイ | ie | ye | i_ | y_ | i | y |
| イイエーイ | ie | | i_ | | i | |
| イイエイ | ie | | i_ | | i | |
| レイザー | reza | | r_z_ | | rz | |
| レイザー | reza | | r_z_ | | rz | |
| レーザー | reza | | r_z_ | | rz | |
| ウォルマート | worumato | uorumato | w_r_m_t_ | u_r_m_t_ | wrmt | urmt |
| ウォールマート | worumato | uorumato | w_r_m_t_ | u_r_m_t_ | wrmt | urmt |

FIGURE 3A

| INPUT (KANA DATA) | PRIMARY FULL PHONETIC KEY | SECONDARY FULL PHONETIC KEY | PRIMARY REPLACED-VOWEL PHONETIC KEY | SECONDARY REPLACED-VOWEL PHONETIC KEY | PRIMARY NO-VOWEL PHONETIC KEY | SECONDARY NO-VOWEL PHONETIC KEY |
|---|---|---|---|---|---|---|
| おおきい | oki | | ok_ | | ok | |
| おーきい | oki | | ok_ | | ok | |
| おうきい | oki | | ok_ | | ok | |
| ちいさい | cisai | | c_s_ | | cs | |
| ちーさい | cisai | | c_s_ | | cs | |
| バレー | bare | | b_r_ | | br | |
| バレエ | bare | | b_r_ | | br | |
| ボウル | Boru | | b_r_ | | br | |
| キャァァ | boru | | b_r_ | | br | |
| オオサカ | osaka | | os_k_ | | osk | |
| オーサカ | osaka | | os_k_ | | osk | |
| オウサカ | osaka | | os_k_ | | osk | |
| キョウト | kyoto | | ky_t_ | | kyt | |
| キョート | kyoto | | ky_t_ | | kyt | |
| けいざい | kezai | | k_z_ | | kz | |
| けーざい | kezai | | k_z_ | | kz | |
| バイオリン | baiori* | | b_r_* | | br* | |
| ヴァイオリン | baiori* | | b_r_* | | br* | |
| フィルター | firuta | | f_r_t_ | | frt | |
| フイルタ | firuta | | f_r_t_ | | frt | |
| ホイール | hoiru | | h_r_ | | hr | |

FIGURE 3B

| INPUT (KANA DATA) | PRIMARY FULL PHONETIC KEY | SECONDARY FULL PHONETIC KEY | PRIMARY REPLACED-VOWEL PHONETIC KEY | SECONDARY REPLACED-VOWEL PHONETIC KEY | PRIMARY NO-VOWEL PHONETIC KEY | SECONDARY NO-VOWEL PHONETIC KEY |
|---|---|---|---|---|---|---|
| ホイール | hoiru | | h_r_ | | hr | |
| フォイール | foiru | | f_r_ | h_r_ | fr | hr |
| フォイル | foiru | hoiru | f_r_ | h_r_ | fr | hr |
| ヴイスキー | uisuki | wisuki | u_s_k_ | w_s_k_ | usk | wsk |
| ウキスキー | uisuki | | u_s_k_ | | usk | |
| ヴィーン | ui* | wi* | u_* | w_* | u* | w* |
| キイン | ui* | wi* | u_* | w_* | u* | w* |
| グァテマラ | gatemara | | g_t_m_r_ | | gtmr | |
| ガテマラ | gatemara | guatemara | g_t_m_r_ | g_t_m_r_ | gtmr | gtmr |
| レビュー | rebyu | | r_by_ | | rby | |
| レビュー | rebyu | rebu | r_by_ | r_b_ | rby | rb |
| ジェットき | je^toki | | j_^t_k_ | | j^tk | |
| じぇっとき | je^toki | | j_^t_k_ | | j^tk | |
| ワイマール | waimaru | | w_m_r_ | | wmr | |
| ワイマル | waimaru | | w_m_r_ | | wmr | |
| ストラヴィンスキー | sutorabi*suki | | s_t_r_b_*s_k_ | | strb*sk | |
| ストラビンスキー | sutorabi*suki | | s_t_r_b_*s_k_ | | strb*sk | |
| ヴューータン | byuta* | buta* | by_t_* | b_t_* | byt* | bt* |
| ビューータン | byuta* | | by_t_* | | byt* | |
| えっちゆう | e^cyu | | e^cy_ | | e^cy | |
| えっちゅー | e^cyu | | e^cy_ | | e^cy | |

PHONETIC KEYS FOR THE JAPANESE LANGUAGE

TECHNICAL FIELD

The field relates generally to language processing systems. More particularly, the field is related to phonetic keys for the Japanese Kana language system.

BACKGROUND

Phonetic keys for the English language have been used in many applications. In computer-related applications, phonetic keys can be used for data searching and database record searching. Typically, a phonetic key is a series of characters that capture the sound of one or more words. The characters in a phonetic key can include a combination of numbers, symbols, and alphabets.

Several methods have been developed to produce phonetic keys for a given word in English or some Latin-based languages. Soundex, Metaphone, and Double Metaphone are some of the methods used for producing phonetic keys. Soundex technique produces a phonetic code consisting of a letter followed by three numbers. Generally, the letter is the first letter of a word, and the numbers encode the remaining consonants. The Metaphone method produces variable-length phonetic keys unlike the fixed-length keys of the Soundex method. Similar sounding words share the same keys in the Metaphone method. The Double Metaphone method produces two phonetic keys, namely, a variable-length primary key as in the Metaphone method and a variable-length secondary key to account for alternate pronunciations.

However, Soundex, Metaphone, Double Metaphone, and other similar methods are suitable for English and Latin-based languages. These methods may not be applicable to complex languages such as the Japanese language. Developing phonetic keys for the Japanese language would be desirable.

SUMMARY

Various embodiments of phonetic keys for the Japanese language are described herein. A user can provide Kana characters either in Hiragana form or Katakana form. The Kana characters are received and a Kana rule set is applied to the Kana characters. The Kana characters are then defined in an alphabetic language, such as English, based on the sound of the Kana characters. A full phonetic key is then generated based on the defined Kana characters. A replaced-vowel phonetic key is generated by replacing a vowel in the full phonetic key and a no-vowel phonetic key is generated by removing the vowel in the full phonetic key. If there are alternate sounds for the same Kana characters, a set of full phonetic keys, replaced-vowel phonetic keys, and no-vowel phonetic keys are generated for each sound. Kana records in a database are then processed to determine a relevant Kana record that has a phonetic key identical to at least one of the full phonetic key, the replaced-vowel phonetic key, and the no-vowel phonetic key. The relevant Kana records are then presented to the user.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for phonetic keys for the Japanese language are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
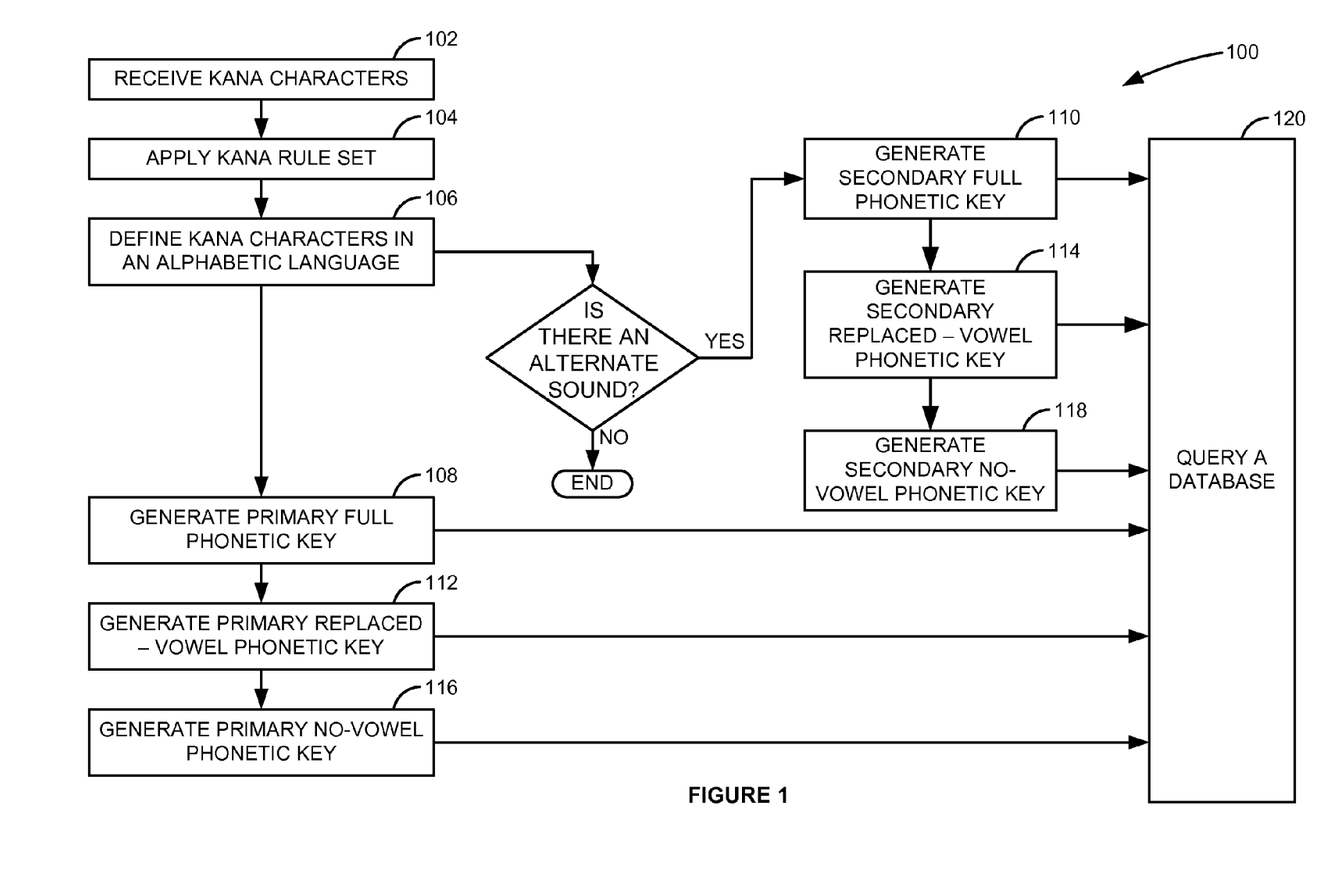
FIG. 1 is a flow diagram illustrating a Japanese-Kana language processing method for generating phonetic keys, according to one embodiment.

FIG. 1 illustrates an embodiment of a Japanese-Kana language processing method 100 for generating phonetic keys. The Kana script includes a Hiragana form or a Katakana form, each having its own character sets. A user can provide Kana characters either in Hiragana or Katakana. These Kana characters can be a Kana word, a part of a Kana word, a Kana syllable, or a plurality of Kana words. The Kana characters provided by the user are received at 102.

At 104, a Kana rule set is applied to the Kana characters. The Kana rule set includes a set of rules that are applied to the Kana characters. Depending on the Kana characters, the rules may partially modify the Kana characters. According to one rule, if the Kana characters include a punctuation mark, the punctuation mark is omitted. Examples of Kana punctuation marks include (shown in square brackets) [ ・ ], [ 。 ], and [ 、 ]. According to another rule, if the Kana characters include a space between them, the space is omitted to obtain continuous Kana characters.

Kana characters can include a special character combination "ヴ" that represents a 'v' sound and long sound character such as "—" or "—." According to another rule, this special character combination "ヴ" is recognized as a single character. According to another rule, the long sound character is omitted from the Kana characters.

Kana can be written in both small form and long form. According to another rule, if the Kana characters include two or more identical and adjoining small form vowel characters, only one of the small form vowel characters are retained. For example, consider the following Kana characters: きゃぁぁ. This set of Kana characters includes two identical and adjoining small form vowel characters, namely, ぁ ぁ. Therefore, by applying this rule, the Kana characters "きゃぁぁ" are converted to "きゃぁ."

According to another rule, if the Kana characters include a first small form character followed by a second small form character, the second small form character is converted into a large form character. For example, consider the following Kana characters: "きゃぁ." This set of Kana characters includes a first small form character 'ゃ' followed by a second small form character 'ぁ.' The second small form character 'ぁ' is therefore converted to its respective large form, i.e. "あ." By applying this rule, the Kana characters "きゃぁ" are converted to "きゃあ."

According to another rule, if the Kana characters include a small form character followed by a large form character of the same character, then the small form character is omitted. For example, consider the following Kana characters: "ぃい." This set of Kana characters includes a small form character 'ぃ' followed by a large form character 'い.' The small form character 'ぃ' is omitted by applying this rule, and the Kana characters "ぃい" are converted to "い."

According to another rule, if the Kana characters include a small tsu character "っ", the small tsu character is converted into a non-Japanese special character or mark. The small tsu character has a pause sound. In one embodiment, the small tsu character is converted into '^.' According to another rule, if the Kana characters include a moraic nasal sound character "ん," the moraic nasal sound character is converted into another non-Japanese special character or mark such as '*.' The character "ん" has a moraic nasal sound.

After applying the rule set at 104, the Kana characters are defined in an alphabetic language at 106 based on their sound. In one embodiment, the Kana characters are defined in the English language. Since the Kana script (Hiragana and Katakana) is a syllabic script, Kana characters include a syllable or combination of syllables. The syllables can be defined in English based on their sound. For example, the Kana syllable "な" in Hiragana sounds like 'na' in English. The Kana syllable "が" in Hiragana sounds like 'ga' in English, the Kana syllable "さ" in Hiragana sounds like 'sa' in English, and the Kana syllable "き" in Hiragana sounds like 'ki' in English. Therefore, if the user provides the Kana characters "ながさき," then they are defined as "nagasaki" in English. FIGS. 2A to 2D show a list of Kana syllables (both Hiragana and Katakana) that are defined in English.

At 108, a primary full phonetic key is generated from the defined Kana characters. In one embodiment, if the defined Kana characters from 106 include two or more adjoining vowels, then the primary full phonetic key is generated by retaining only one vowel. For example, a primary full phonetic key "oki" is generated from the defined Kana characters "ookii" (大きい). Also, if the defined Kana characters include a vowel combination of "ei" or "ou," then the primary full phonetic key is generated by retaining only the vowel 'e' or 'o,' respectively. If the defined Kana characters do not include adjoining vowels or the vowel combination of "ei" or "ou," then the defined Kana characters form the primary full phonetic key.

Some Kana words may have alternate sounds. If a Kana word has two different sounds, then a primary full phonetic key is generated for a first sound at 108 and a secondary phonetic key is generated for a second sound at 110. A single full phonetic key is generated if there is no alternate sound. Consider the following Kana characters: ウォルマート. These Kana characters have two different sounds. Specifically, "ウォ" has two sounds, namely, "wo" and "uo." A primary full phonetic key "worumato" is generated for a first sound and a secondary full phonetic key "uorumato" is generated for a second sound.

After the primary full phonetic key is generated, a primary replaced-vowel phonetic key is generated 112. The primary replaced-vowel phonetic key is generated by replacing all the vowels in the primary full phonetic key with a non-Japanese special character such as an underscore mark. For example, "worumato" has vowels 'o,' 'u,' 'a,' and 'o'. Therefore, "w_r_m_t_" is primary replaced-vowel phonetic key can be generated from the primary full phonetic key "worumato." Similarly, if there is a secondary full phonetic key, a secondary replaced-vowel phonetic key can be generated at 114 by replacing the vowels in the secondary full phonetic key with an underscore mark. But a first vowel in the primary full phonetic key or the secondary full phonetic key is retained if the primary full phonetic key or the secondary full phonetic key starts with the first vowel. For example, the secondary full phonetic key "uorumato" has vowels 'u,' 'o,' 'u,' 'a,' and 'o' in the same order. The first or starting vowel is the first 'u.' Therefore, "u_r_m_t_" is the secondary replaced-vowel phonetic key.

A primary no-vowel phonetic key is generated at 116 using the primary full phonetic key. The primary no-vowel phonetic key is generated by removing the vowels in the primary full phonetic key. For example, the primary full phonetic key "worumato" has vowels 'o,' 'u,' 'a,' and 'o.' Therefore, "wrmt" is the primary no-vowel phonetic key that will be generated. Similarly, if there is a secondary full phonetic key, a secondary no-vowel phonetic key can be generated at 118 by removing the vowels in the secondary full phonetic key. A first vowel in the primary full phonetic key or the secondary full phonetic key is not removed if the primary full phonetic key or the secondary full phonetic key starts with the first vowel. For example, the secondary full phonetic key "uorumato" has vowels 'u,' 'o,' 'u,' 'a,' and 'o,' with the first or starting vowel 'u.' Therefore, "urmt" is the secondary no-vowel phonetic key that will be generated.

The primary full phonetic key, the primary replaced-vowel phonetic key, and the primary no-vowel phonetic key can then be used in several applications. In one embodiment, a single phonetic key (full, replaced-vowel, or no-vowel) or a combination of these phonetic keys are used to query a database at 120. And if an alternate sound exists, the secondary full phonetic key, the secondary replaced-vowel phonetic key, and the secondary no-vowel phonetic key are also generated and used to query a database.

Figure 2A:
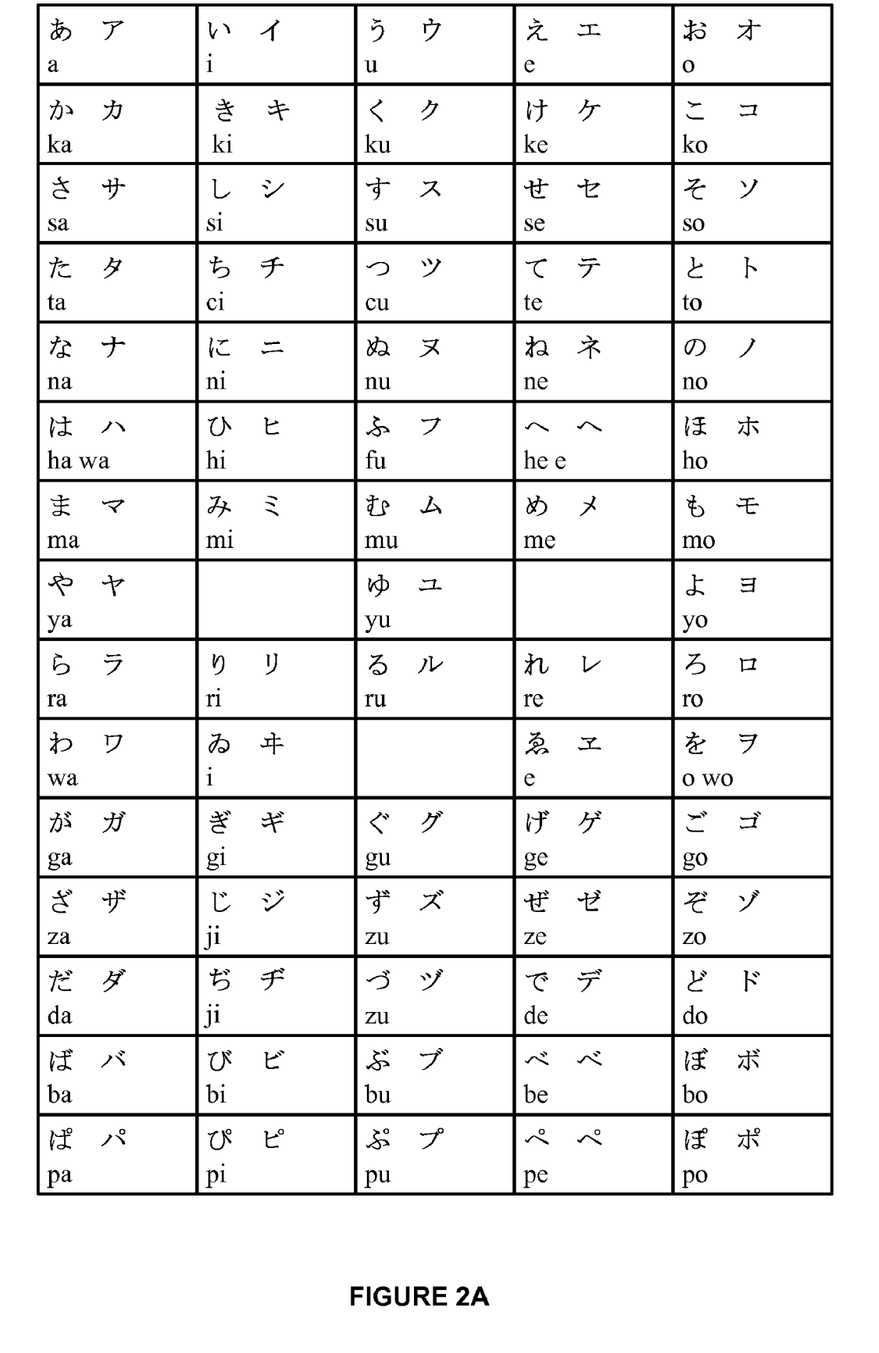
FIGS. 2A to 2D illustrate a tabular list of syllabic Kana characters and their respective definitions in English, according to one embodiment.
Figure 2B:
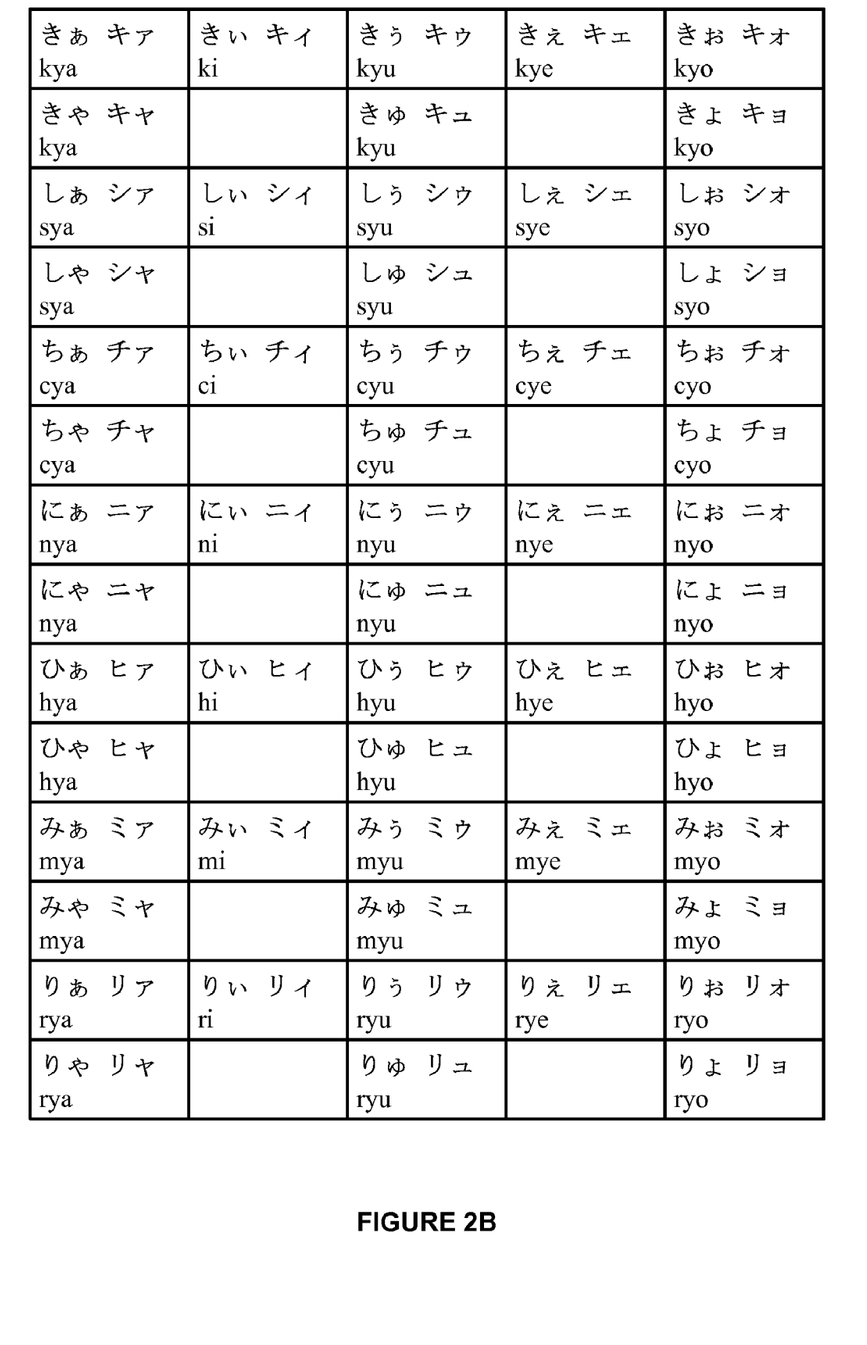
Figure 2C:
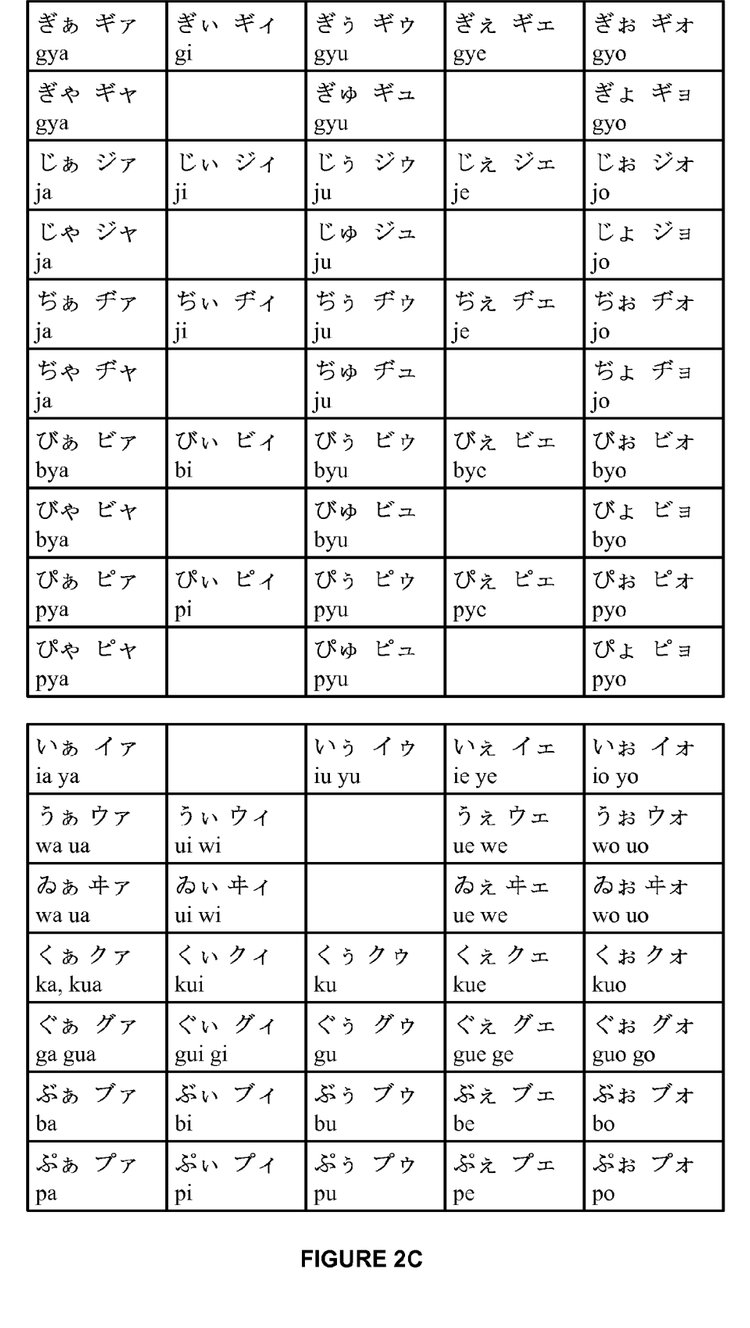
Figure 2D:
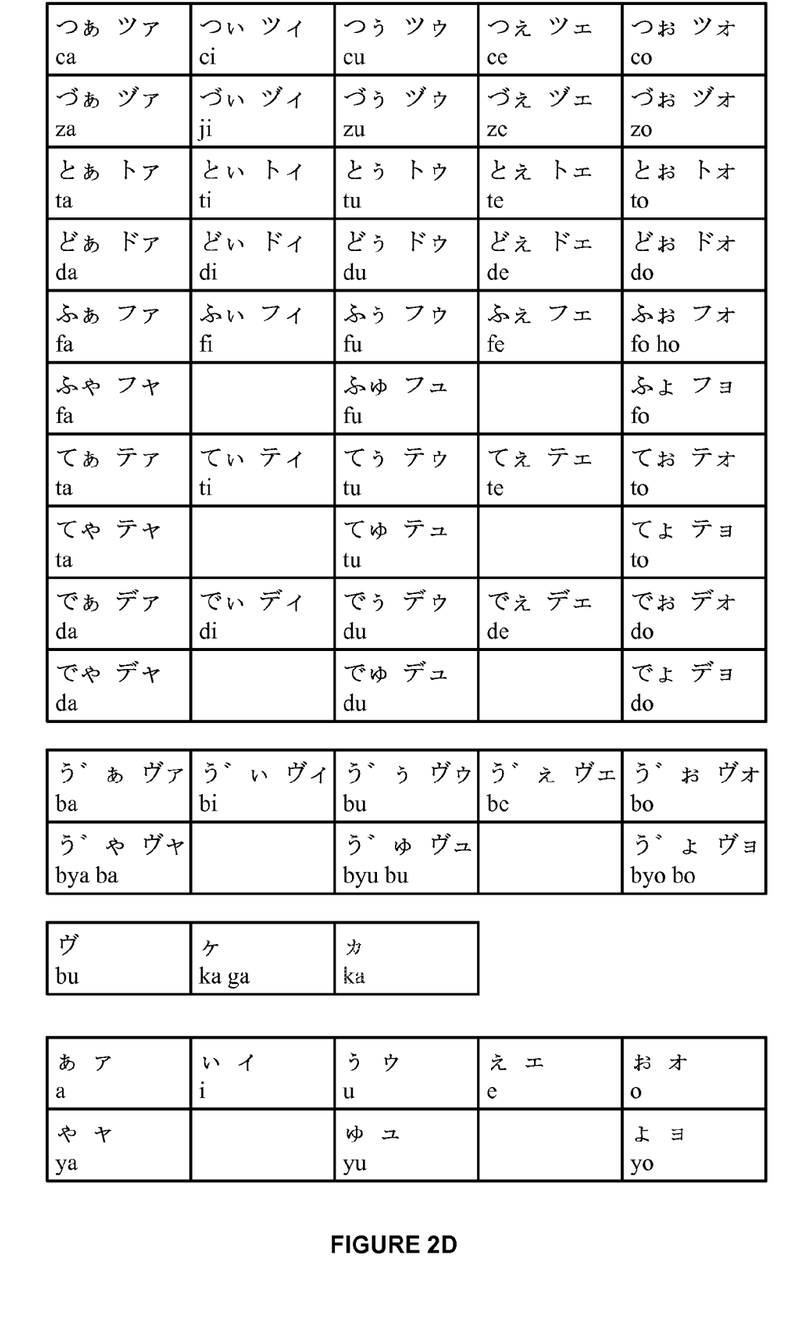

FIGS. 2A to 2D show a list of syllabic Kana characters that are defined in English. Both Hiragana and Katakana characters are presented. The characters on the left are the Hiragana characters and the characters on the right are the Katakana characters. For example, in FIG. 2A, "か" is a Hiragana character that is defined as "ka" in English and "カ" is a Katakana character that is also defined as "ka" in English. More than one Kana character can form a single syllable that can be defined in English. For example, in FIG. 2B, "にゃ" are Hiragana characters and "ニャ" are Katakana characters that are defined as "nya" in English. In FIG. 2C, "びゃ" are Hiragana characters and "ビャ" are Katakana characters that are defined as "pya" in English. In FIG. 2D, "てょ" are Hiragana characters and "テョ" are Katakana characters that are defined as "to" in English. This tabular list may be provided in a database. This list may not be exhaustive and can be edited or updated according to preferences and to keep pace with developments in Kana language.

Figure 3A:
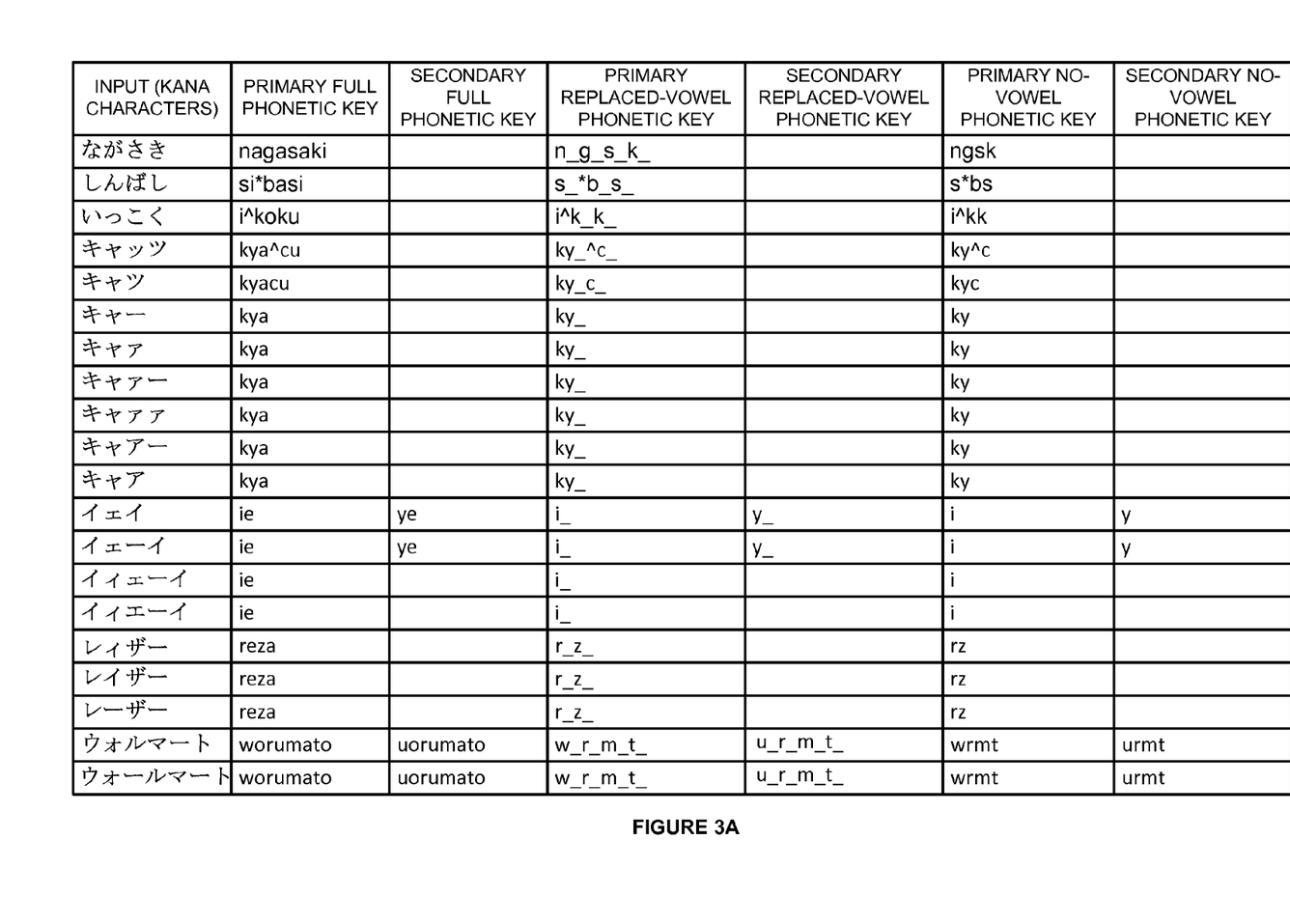
FIGS. 3A to 3C illustrate exemplary phonetic keys that are generated from the Kana characters, according to one embodiment.
Figure 3B:
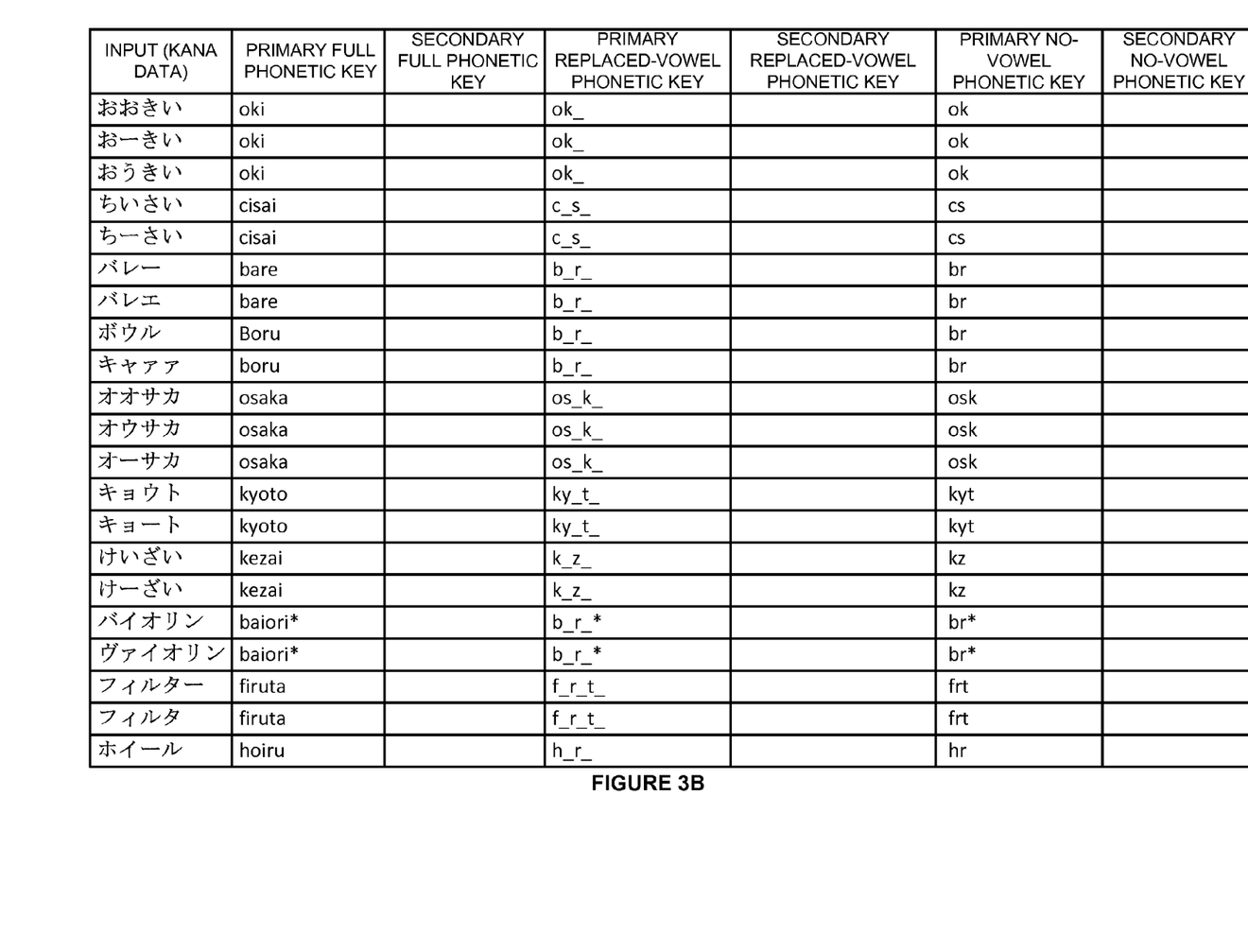
Figure 3C:
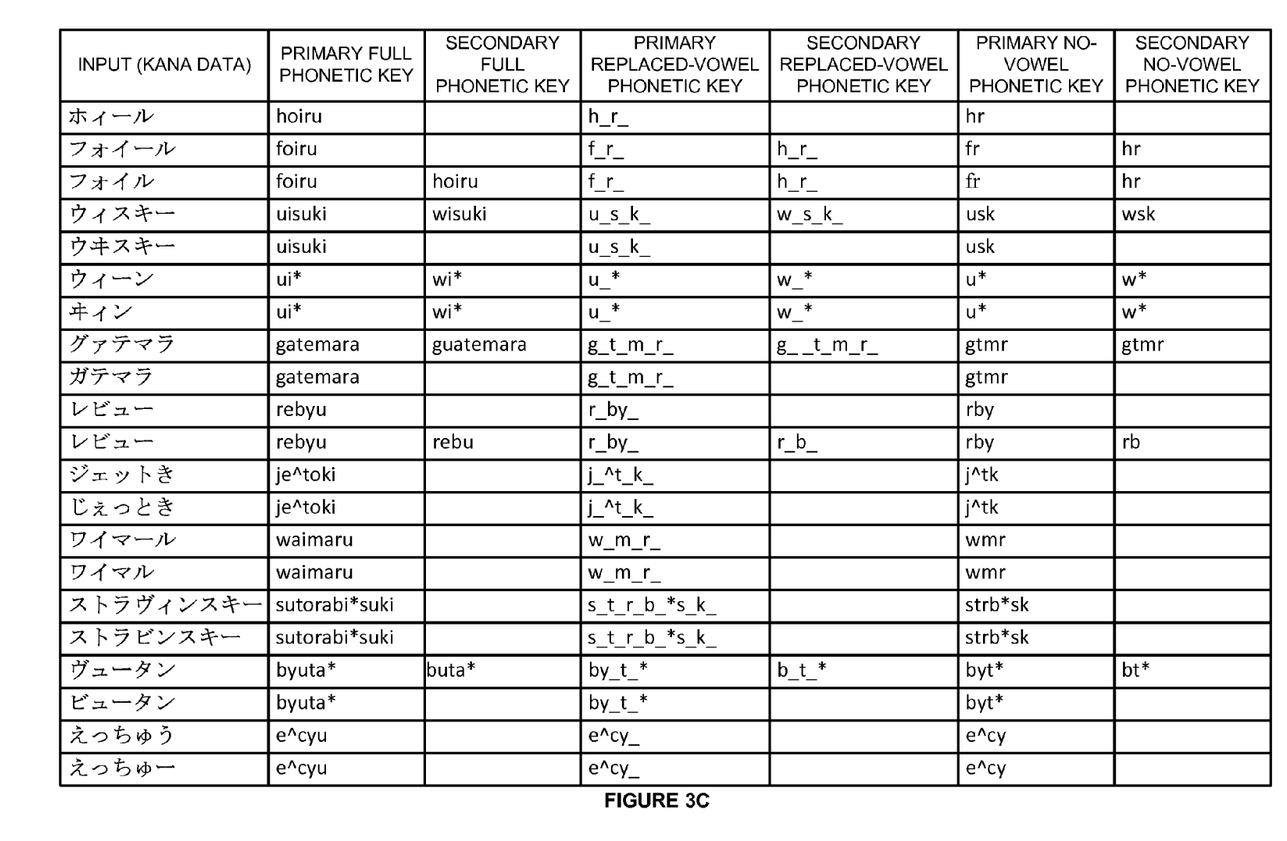

FIGS. 3A to 3C show an exemplary list of phonetic keys that are generated from the Kana characters, as examples. These phonetic keys are generated based on the procedure described in reference to FIG. 1. As an example, consider the Kana (Hiragana) characters "しんばし." By applying the Kana rule set, "ん" is converted into '*.' Following which, the sound of "しばし" can be defined in English by referring to the list shown in FIGS. 2A-2D. "し" sounds like "si" and "ば" sounds like "ba." Therefore, the Kana characters "しんばし" are defined as "si*basi." The defined Kana characters do not include adjoining vowels or the vowel combination of "ei" or "ou." Therefore, the full phonetic key is "si*basi." The replaced-vowel phonetic key is "s_*b_s_" and the no-vowel phonetic key is "s*bs." These are only primary phonetic keys. Secondary phonetic keys are not generated for this example since there is no alternate sound for any of the characters in "しんばし."

In another example, consider the Kana characters "いっこく." By applying the Kana rule set, "っ" is converted into '^.' The character "い" sounds like "i," "こ" sounds like "ko," and "く" sounds like "ku." Therefore, the Kana characters "いっこく" are defined as "i^koku." Therefore, the full phonetic key is "i^koku," the replaced-vowel phonetic key is "i ^k_k_" and the no-vowel phonetic key is "i^kk."

As another example, consider the Kana (Katakana) characters "ウィスキー." The last character "—" is the long sound character. This long sound character is omitted according to one rule of the rule set as discussed previously. The Kana characters "ウィスキ" can then be defined in English by referring to FIGS. 2A to 2D. "ウィ" has two sounds, namely, "ui" and "wi." "ス" sounds like "su" and "キ" sounds like "ki." Therefore, the Kana characters "ウィスキ" are defined as "uisuki." Since there no identical and adjoining vowels or the vowel combination of "ei" or "ou," the primary full phonetic key is "uisuki." The primary replaced-vowel phonetic key is "u_s_k_" and the primary no-vowel phonetic key is "usk." Similarly, the secondary full phonetic key is "wisuki," the secondary replaced-vowel phonetic key is "w_s_k_" and the secondary no-vowel phonetic key is "wsk." Other keys in FIGS. 3A TO 3C are similarly generated.

Figure 4:
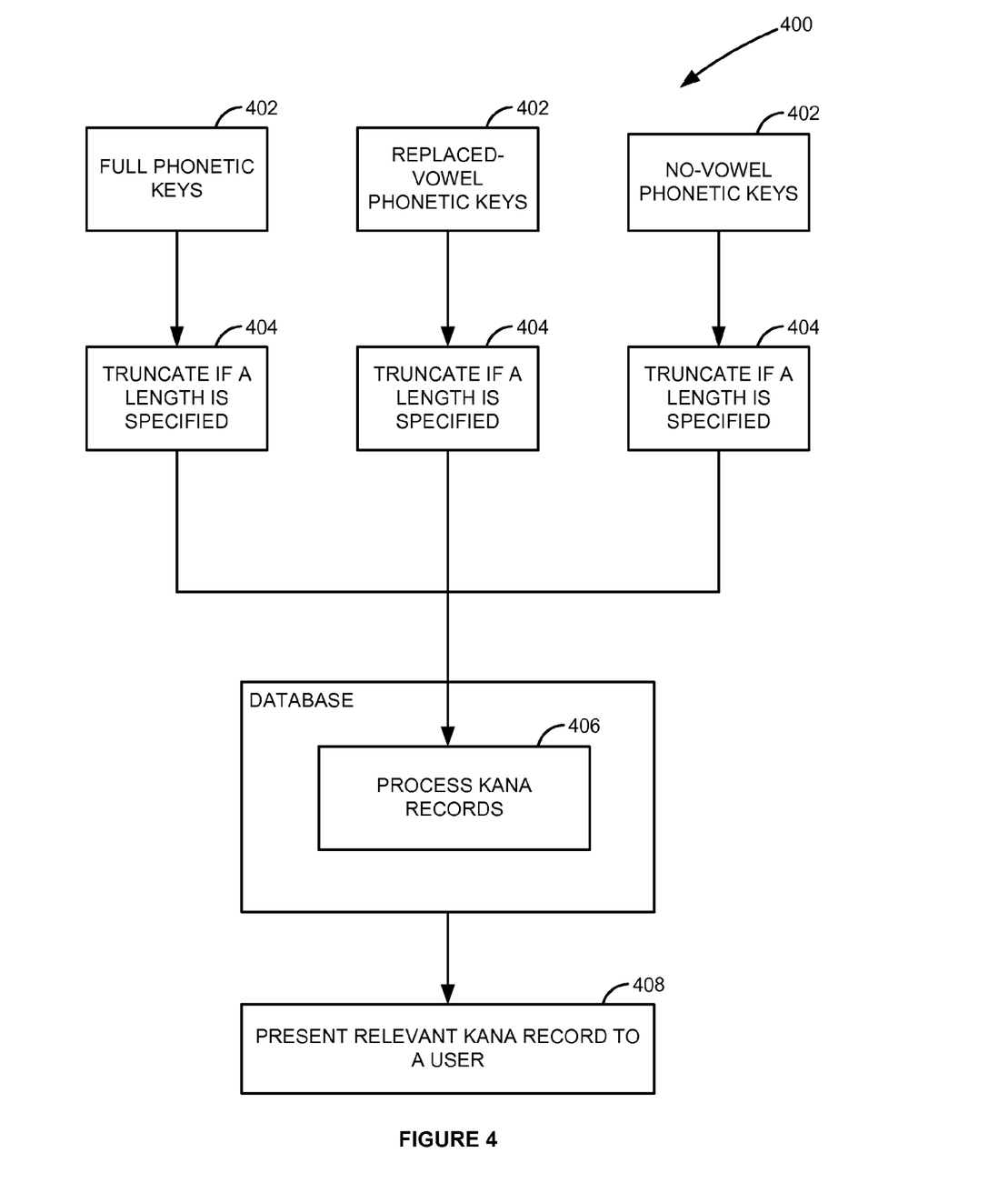
FIG. 4 is a block diagram illustrating a procedure for finding a relevant Kana word using the phonetic keys, according to one embodiment.

The phonetic keys can be used in several ways and environments. According to one embodiment 400 as shown in FIG. 4, the phonetic keys can be used to find relevant Kana words in a database. For a Kana character provided by a user, a full phonetic key, a replaced-vowel phonetic key, and a no-vowel phonetic key are generated at 402 according to the method described in FIG. 1. In one embodiment, the phonetic keys can be truncated at 404 to a desired or specified length. This length can be a system configuration. For example, if the phonetic key length is specified as six characters or less, then the generated full phonetic key, replaced-vowel phonetic key, and no-vowel phonetic key are truncated at 404 if they have more than six characters.

At 406, Kana records in a database are processed to determine a relevant Kana record. The Kana records include Kana words or any data in Kana. As part of processing, phonetic keys of the Kana records in the database are compared with the full phonetic key, the replaced-vowel phonetic key, and the no-vowel phonetic key. A relevant Kana record can then be determined as the word or words having a phonetic key identical to any one of the full phonetic key, the replaced-vowel phonetic key, and the no-vowel phonetic key. The phonetic keys of the Kana records in the database can be determined using the procedure described in FIG. 1 (i.e. by applying rule set, defining in English, and generating full, replaced-vowel, and no-vowel phonetic keys) and stored in the database. The relevant Kana record is then presented to the user at 408.

At 406, the full phonetic key, the replaced-vowel phonetic key, and the no-vowel phonetic key can be selectively used based on the level of similarity required between the user-entered Kana characters and database records. For example, if there is a requirement for closest or exact match, the full phonetic key can be used to retrieve records from the database. If the requirement is to find similar matches, the replaced-vowel phonetic key can be used, which increases the number of records obtained from the database. An even lower level of similar matches can be obtained using the no-vowel phonetic key, which further increases the number of records obtained from the database.

As part of the processing, multiple keys can be used to find relevant results in an efficient way. For example, the full phonetic key can be used first to retrieve records from the database. If the results are satisfactory, the process of searching with replaced-vowel and no-vowel phonetic keys can be stopped. If good results are not returned or if there are no records obtained by using the full phonetic key, the match criteria can be broadened using the replaced-vowel phonetic key to get more similar matches. If the results are still not satisfactory, the no-vowel phonetic key can be used to find less similar matches.

As an example, a user may enter a Kana word 'キョウト,' without specifying any length for the phonetic keys. Following which, a full phonetic key 'kyoto,' a replaced-vowel phonetic key 'ky_t_,' and a no-vowel phonetic key 'kyt' are generated. The full phonetic key 'kyoto' is used to find an almost exact match when searching in a database. Kana words or data that can be spelled differently but have the same sound can be found using the full phonetic key. For example, the Kana word 'キョート' has the same sound (sounds like Kyoto) as the Kana word 'キョウト' (provided by the user) though spelled differently. The full phonetic key of the Kana word 'キョート' is 'kyoto,' which is identical to the full phonetic key of the Kana word 'キョウト' (provided by the user). Therefore, 'キョート' can be determined as a relevant Kana word or record using the full phonetic key 'kyoto.'

The replaced-vowel phonetic key 'ky_t_' can be used to find Kana words or data that have a similar sound. For example, the Kana words 'キョウト' (sounds like 'kyoto'), 'キョート' (sounds like 'kyoto'), and 'キュート' (sounds like 'cute') have the same replaced-vowel key 'ky_t_.' Therefore, 'キョート' and 'キュート' can be determined as the relevant Kana words using the replaced-vowel phonetic key 'ky_t_.'

The no-vowel phonetic key 'kyt' can be used to broaden the search to find Kana words or data with lesser extent of similarity. The Kana words 'キョウト' (sounds like 'kyoto'), 'キョート' (sounds like 'kyoto'), 'キュート' (sounds like 'cute'), and 'コヨーテ' (sounds like 'coyote') have the same no-vowel key 'kyt.' Therefore, ',' 'キュート,' and 'コヨーテ' can be determined as the relevant Kana words using the no-vowel phonetic key 'kyt.'

Figure 5:
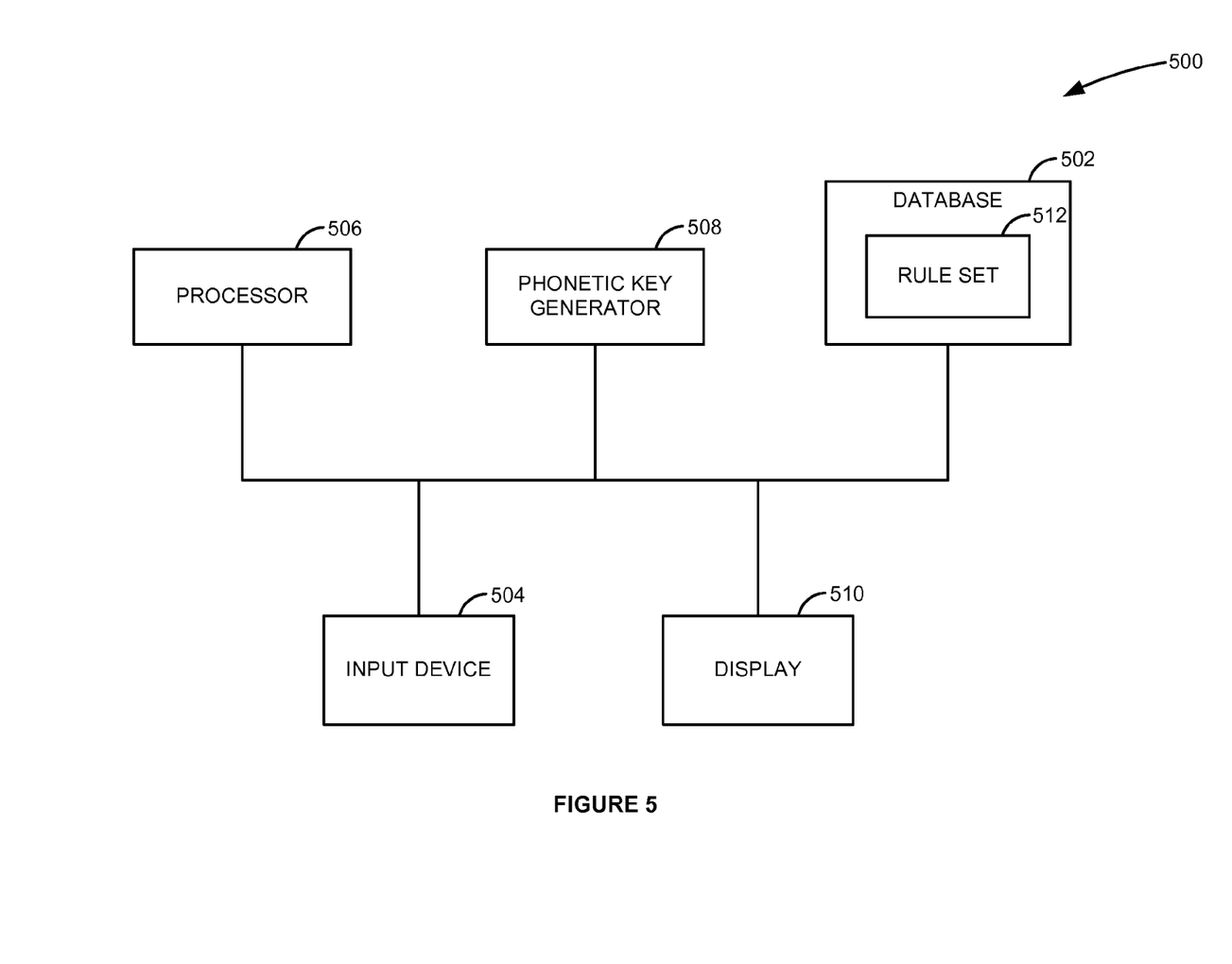
FIG. 5 is a block diagram of a system for processing Japanese-Kana language, according to one embodiment.

FIG. 5 illustrates a system 500 for processing Japanese-Kana language, according to one embodiment. The system 500 includes a database 502, an input device 504, a processor 506, a phonetic key generator 508, and a presentation device such as a display 510. The database 502 includes Kana records or any Kana data in Japanese Kana language. The database 502 can also include additional records or data in Kanji or any other language in addition to the Kana records. The additional records may be associated with Kana records. A user enters Kana characters using the input device 504. The input device 504 can be a keyboard or a device that converts speech into text. The processor 506 executes instructions in the phonetic key generator 508 after the Kana characters are received. A Kana rule set 512 is then applied to the Kana characters. In one embodiment, the Kana rule set 512 can be stored in the database 502. The tabular list shown in FIGS. 2A to 2D can also be provided in the database 502. This list can be updated and customized. The list is used to define Kana characters in English based on their sound. Following which, a full phonetic key, a replaced-vowel phonetic key, and a no-vowel phonetic key are generated.

The phonetic keys can be truncated to a desired or specified length. This length can be part of the system 500 configuration. The processor 506 then processes data in the database 502 to determine relevant Kana words. The processor 502 refers to the phonetic key generator 508 to determine which Kana records in the database 502 have phonetic keys identical to the generated phonetic keys. In one embodiment, the full, replaced-vowel, and no-vowel phonetic keys for the Kana records in the database 502 are generated and stored in the database 502. These stored phonetic keys can be readily used to compare with the generated phonetic keys. The relevant Kana records include Kana words that have phonetic keys identical to at least one of the generated phonetic keys. The relevant Kana records are then presented to the user on the display 510. Any additional data (in Kanji or other language) associated with the relevant Kana records can also be presented to the user on the display 510. The processor can selectively use any one or combination of the generated phonetic keys (full, replaced-vowel, or no-vowel) based on the level of similarity required between the user-entered Kana characters and Kana records in the database. This level of similarity can be configured in the system 500.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
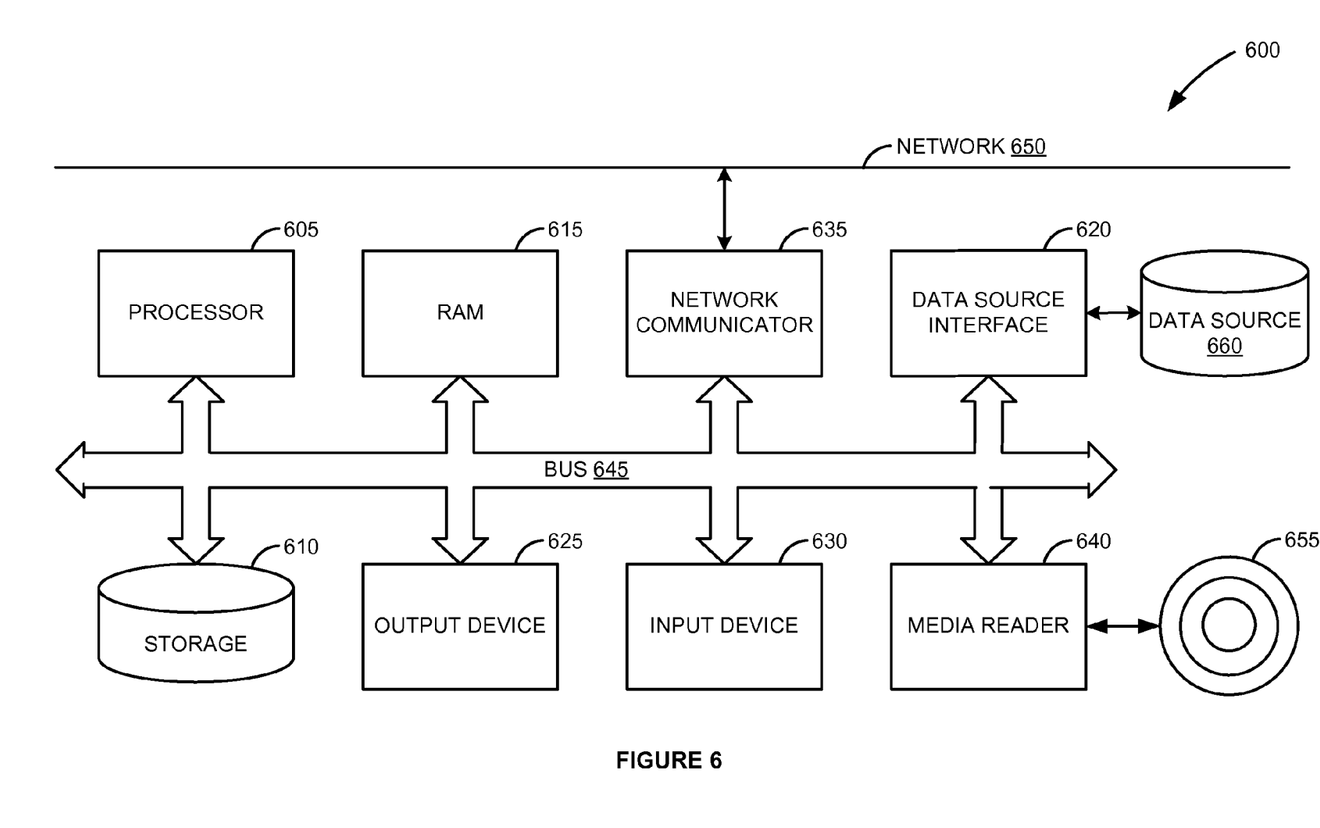
FIG. 6 is a block diagram of an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however, that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   receive at least one Kana character from a user;
   apply a Kana rule set to the at least one Kana character;
   define the at least one Kana character in an alphabetic language based on a sound of the at least one Kana character;
   generate a full phonetic key for the defined at least one Kana character;
   generate a replaced-vowel phonetic key by replacing a vowel in the full phonetic key;
   generate a no-vowel phonetic key by removing the vowel in the full phonetic key;
   process Kana records in a database to determine a relevant Kana record that has a phonetic key identical to at least one of the full phonetic key, the replaced-vowel phonetic key, and the no-vowel phonetic key; and
   present the relevant Kana record to the user.

2. The article of manufacture of claim 1, further comprising instructions which when executed by the computer further causes the computer to:
truncate the full phonetic key, the replaced-vowel phonetic key, the no-vowel phonetic key, or combinations thereof to a specified length.

3. The article of manufacture of claim 1, wherein:
   generating the full phonetic key, comprises generating a primary full phonetic key; and if an alternate sound exists, generating a secondary full phonetic key;
   generating the replaced-vowel phonetic key, comprises generating a primary replaced-vowel phonetic key by replacing a vowel in the primary full phonetic key; and if the alternate sound exists, generating a secondary replaced-vowel key by replacing a vowel in the secondary full phonetic key; and
   generating the no-vowel phonetic key, comprises generating a primary no-vowel phonetic key by removing the vowel in the primary full phonetic key; and if the alternate sound exists, generating a secondary no-vowel key by removing the vowel in the secondary full phonetic key.

4. The article of manufacture of claim 1, wherein the Kana rule set comprises:
   if the at least one Kana character includes a punctuation mark, omitting the punctuation mark;
   if the at least one Kana character includes a space, omitting the space;
   if the at least one Kana character includes a special character combination representing a "v" sound, recognizing the special character combination as one character; and
   if the at least one Kana character includes a long sound character, omitting the long sound character.

5. The article of manufacture of claim 1, wherein the Kana rule set comprises:
   if the at least one Kana character includes two or more identical and adjoining small form vowel characters, retaining only one of the small form vowel characters;
   if the at least one Kana character includes a first small form character followed by a second small form character, converting the second small form character into a large form character; and
   if the at least one Kana character includes a small form character followed by a succeeding large form character of a same character, omitting the small form character.

6. The article of manufacture of claim 1, wherein the Kana rule set comprises:
   if the at least one Kana character includes a small tsu character, converting the small tsu character into a first non-Japanese special character or mark; and
   if the at least one Kana character includes a moraic nasal sound character, converting the moraic nasal sound character into a second non-Japanese special character or mark.

7. The article of manufacture of claim 1, wherein generating the full phonetic key, comprises:
   if the defined at least one Kana character includes two or more identical and adjoining vowels, retaining only one of the vowels.

8. The article of manufacture of claim 1, wherein generating the full phonetic key, comprises:
   if the defined at least one Kana character includes a first vowel combination of "ei," retaining only the vowel "e"
   if the defined at least one Kana character includes a second vowel combination of "ou," retaining only the vowel "o."

9. The article of manufacture of claim 1, wherein generating the replaced-vowel phonetic key comprises:

replacing all the vowels in the full phonetic key, except for a first vowel if the full phonetic key starts with the first vowel, with a non-Japanese special character.

10. The article of manufacture of claim 9, wherein the non-Japanese special character is an underscore mark.

11. The article of manufacture of claim 1, wherein generating the no-vowel phonetic key comprises:
removing all the vowels, except for a first vowel if the full phonetic key starts with the first vowel, in the full phonetic key.

12. The article of manufacture of claim 1, wherein the alphabetic language is English.

13. A computerized language processing method for Japanese Kana, the method comprising:
receiving at least one Kana character from a user from an input device;
applying a Kana rule set to the at least one Kana character, wherein the Kana rule set is in a database;
defining the at least one Kana character in an alphabetic language based on a sound of the at least one Kana character;
generating a full phonetic key for the defined at least one Kana character;
generating a replaced-vowel phonetic key by replacing a vowel in the full phonetic key;
generating a no-vowel phonetic key by removing the vowel in the full phonetic key;
processing Kana records in the database to determine a relevant Kana record that has a phonetic key identical to at least one of the full phonetic key, the replaced-vowel phonetic key, and the no-vowel phonetic key; and
presenting the relevant Kana record to the user.

14. The method of claim 13, further comprising:
truncating the full phonetic key, the replaced-vowel phonetic key, the no-vowel phonetic key, or combinations thereof to a specified length.

15. The method of claim 13, wherein:
generating the full phonetic key, comprises generating a primary full phonetic key; and if an alternate sound exists, generating a secondary full phonetic key;
generating the replaced-vowel phonetic key, comprises generating a primary replaced-vowel phonetic key by replacing a vowel in the primary full phonetic key; and if the alternate sound exists, generating a secondary replaced-vowel key by replacing a vowel in the secondary full phonetic key; and
generating the no-vowel phonetic key, comprises: generating a primary no-vowel phonetic key by removing the vowel in the primary full phonetic key; and if the alternate sound exists, generating a secondary no-vowel key by removing the vowel in the secondary full phonetic key.

16. The method of claim 13, wherein the Kana rule set comprises:
if the at least one Kana character includes a punctuation mark, omitting the punctuation mark;
if the at least one Kana character includes a space, omitting the space;
if the at least one Kana character includes a special character combination representing a "v" sound, recognizing the special character combination as one character; and
if the at least one Kana character includes a long sound character, omitting the long sound character.

17. The method of claim 13, wherein the Kana rule set comprises:
if the at least one Kana character includes two or more identical and adjoining small form vowel characters, retaining only one of the small form vowel characters;
if the at least one Kana character includes a first small form character followed by a second small form character, converting the second small form character into a large form character; and
if the at least one Kana character includes a small form character followed by a succeeding large form character of a same character, omitting the small form character.

18. The method of claim 13, wherein the Kana rule set comprises:
if the at least one Kana character includes a small tsu character, converting the small tsu character into a first non-Japanese special character or mark; and
if the at least one Kana character includes a moraic nasal sound character, converting the moraic nasal sound character into a second non-Japanese special character or mark.

19. The method of claim 13, generating the full phonetic key, comprises:
if the defined at least one Kana character includes two or more identical and adjoining vowels, retaining only one of the vowels.

20. The method of claim 13, wherein generating the full phonetic key, comprises:
if the defined at least one Kana character includes a first vowel combination of "ei," retaining only the vowel "e"
if the defined at least one Kana character includes a second vowel combination of "ou," retaining only the vowel "o."

21. The method of claim 13, wherein generating the replaced-vowel phonetic key comprises:
replacing all the vowels in the full phonetic key, except for a first vowel if the full phonetic key starts with the first vowel, with a non-Japanese special character.

22. The method of claim 21, wherein the non-Japanese special character is an underscore mark.

23. The method of claim 13, wherein generating the no-vowel phonetic key comprises:
removing all the vowels, except for a first vowel if the full phonetic key starts with the first vowel, in the full phonetic key.

24. The method of claim 13, wherein the alphabetic language is English.

25. A computer system for processing Japanese Kana language, comprising:
a computer memory to store program code; and
a processor to execute the program code to:
receive at least one Kana character from a user;
apply a Kana rule set to the at least one Kana character;
define the at least one Kana character in an alphabetic language based on a sound of the at least one Kana character;
generate a full phonetic key for the defined at least one Kana character;
generate a replaced-vowel phonetic key by replacing a vowel in the full phonetic key;
generate a no-vowel phonetic key by removing the vowel in the full phonetic key;
process Kana records in a database to determine a relevant Kana record that has a phonetic key identical to at least one of the full phonetic key, the replaced-vowel phonetic key, and the no-vowel phonetic key; and
present the relevant Kana record to the user.

26. The system of claim 25, wherein the processor further executes the program code to:
truncate the full phonetic key, the replaced-vowel phonetic key, the no-vowel phonetic key, or combinations thereof to a specified length.

27. The system of claim 25, wherein:
generate the full phonetic key, comprises generating a primary full phonetic key; and if an alternate sound exists, generating a secondary full phonetic key;
generate the replaced-vowel phonetic key, comprises generating a primary replaced-vowel phonetic key by replacing a vowel in the primary full phonetic key; and if the alternate sound exists, generating a secondary replaced-vowel key by replacing a vowel in the secondary full phonetic key; and
generate the no-vowel phonetic key, comprises: generating a primary no-vowel phonetic key by removing the vowel in the primary full phonetic key; and if the alternate sound exists, generating a secondary no-vowel key by removing the vowel in the secondary full phonetic key.

28. The system of claim 25, wherein the Kana rule set comprises:
if the at least one Kana character includes a punctuation mark, omitting the punctuation mark;
if the at least one Kana character includes a space, omitting the space;
if the at least one Kana character includes a special character combination representing a "v" sound, recognizing the special character combination as one character; and
if the at least one Kana character includes a long sound character, omitting the long sound character.

29. The system of claim 25, wherein the Kana rule set comprises:
if the at least one Kana character includes two or more identical and adjoining small form vowel characters, retaining only one of the small form vowel characters;
if the at least one Kana character includes a first small form character followed by a second small form character, converting the second small form character into a large form character; and
if the at least one Kana character includes a small form character followed by a succeeding large form character of a same character, omitting the small form character.

30. The system of claim 25, wherein the Kana rule set comprises:
if the at least one Kana character includes a small tsu character, converting the small tsu character into a first non-Japanese special character or mark; and
if the at least one Kana character includes a moraic nasal sound character, converting the moraic nasal sound character into a second non-Japanese special character or mark.

31. The system of claim 25, wherein generate the full phonetic key, comprises:
if the defined at least one Kana character includes two or more identical and adjoining vowels, retaining only one of the vowels.

32. The system of claim 25, wherein generate the full phonetic key, comprises:
if the defined at least one Kana character includes a first vowel combination of "ei," retaining only the vowel "e"
if the defined at least one Kana character includes a second vowel combination of "ou," retaining only the vowel "o."

33. The system of claim 25, wherein generate the replaced-vowel phonetic key comprises:
replacing all the vowels in the full phonetic key, except for a first vowel if the full phonetic key starts with the first vowel, with a non-Japanese special character.

34. The system of claim 33, wherein the non-Japanese special character is an underscore mark.

35. The system of claim 25, wherein generate the no-vowel phonetic key comprises:
removing all the vowels, except for a first vowel if the full phonetic key starts with the first vowel, in the full phonetic key.

36. The system of claim 25, wherein the alphabetic language is English.

* * * * *